US011873598B2

(12) United States Patent
Chapman et al.

(10) Patent No.: US 11,873,598 B2
(45) Date of Patent: Jan. 16, 2024

(54) CARTRIDGE BIN FOR A ROTATABLE DRUM

(71) Applicants: Wade Chapman, Thomasville, GA (US); Nathan Parrow, Oklahoma City, OK (US)

(72) Inventors: Wade Chapman, Thomasville, GA (US); Nathan Parrow, Oklahoma City, OK (US)

(73) Assignee: Wade Chapman, Thomasville, GA (US)

( * ) Notice: Subject to any disclaimer, the term of this patent is extended or adjusted under 35 U.S.C. 154(b) by 0 days.

(21) Appl. No.: 18/186,142

(22) Filed: Mar. 17, 2023

(65) Prior Publication Data

US 2023/0243083 A1 Aug. 3, 2023

Related U.S. Application Data

(63) Continuation-in-part of application No. 17/122,279, filed on Dec. 15, 2020, now Pat. No. 11,608,578.

(60) Provisional application No. 62/949,384, filed on Dec. 17, 2019.

(51) Int. Cl.
*D06F 37/04* (2006.01)
*F16D 27/09* (2006.01)
*F16D 11/16* (2006.01)
*D06F 23/02* (2006.01)

(52) U.S. Cl.
CPC .............. *D06F 37/04* (2013.01); *D06F 23/02* (2013.01); *F16D 11/16* (2013.01); *F16D 27/09* (2013.01)

(58) Field of Classification Search
CPC ........... D06F 23/02; F16D 11/16; F16D 27/09
See application file for complete search history.

(56) References Cited

U.S. PATENT DOCUMENTS

| 1,220,308 | A | 3/1917 | Young et al. |
| 1,584,770 | A | 5/1926 | Hurd |
| 1,945,477 | A | 1/1934 | Cimarik et al. |
| 2,645,914 | A | 7/1953 | Sessions |
| 2,655,021 | A | 10/1953 | Neher |
| 5,376,175 | A * | 12/1994 | Long, Jr. ................. B05B 17/00 366/54 |
| 10,458,054 | B1* | 10/2019 | Hamilton ................. D06F 31/00 |
| 10,844,530 | B2* | 11/2020 | Jones ..................... D06F 29/005 |
| 2004/0000175 | A1* | 1/2004 | Bolduan ................. D06F 17/04 68/17 R |
| 2014/0251215 | A1* | 9/2014 | Pilipauskas ......... B05B 13/0257 118/713 |
| 2016/0303606 | A1* | 10/2016 | Pilipauskas ............... B05B 9/00 |
| 2018/0100262 | A1* | 4/2018 | Prushinskiy ............. D06F 35/00 |
| 2018/0291545 | A1* | 10/2018 | Jones ..................... D06F 34/05 |

(Continued)

FOREIGN PATENT DOCUMENTS

JP 5489930 B2 3/2014
KR 960011495 B1 8/1996

*Primary Examiner* — David Phantana-angkool
(74) *Attorney, Agent, or Firm* — Law Office of Steven R. Olsen, PLLC; Steven R. Olsen

(57) ABSTRACT

The invention is directed to a cartridge bin and a rotatable drum. The objective is to reduce labor associated with loading and unloading articles processed in a rotatable drum, for instance during laundering operations. The cartridge bin is configured to at least partially nest within the rotatable drum. Features are disclosed to rotationally align and couple these two components.

7 Claims, 7 Drawing Sheets

(56) References Cited

U.S. PATENT DOCUMENTS

| | | | |
|---|---|---|---|
| 2020/0325610 A1* | 10/2020 | Chae | D06F 39/022 |
| 2020/0325617 A1* | 10/2020 | Chae | D06F 33/37 |
| 2021/0131005 A1* | 5/2021 | Magnusson | D06F 17/12 |
| 2021/0354167 A1* | 11/2021 | Pilipauskas | B05C 9/02 |
| 2022/0034019 A1* | 2/2022 | Daniels | C01B 13/10 |
| 2022/0081828 A1* | 3/2022 | Rabbani | D06F 43/06 |
| 2022/0098779 A1* | 3/2022 | Coney | D06F 33/52 |

* cited by examiner

CARTRIDGE BIN FOR A ROTATABLE DRUM

CROSS-REFERENCE TO RELATED APPLICATIONS

This application is a continuation-in-part (CIP) of prior U.S. application Ser. No. 17/122,279, filed Dec. 15, 2020, which claims the benefit of U.S. Provisional Application No. 62/949,384, filed Dec. 17, 2019.

BACKGROUND

Field of Invention

The invention relates generally to batch-processing equipment. More specifically, but not by way of limitation, embodiments of the invention provide a cartridge bin that is nested in, and removably-coupled to, a rotatable drum for use in clothes laundering or other process.

Description of the Related Art

Clothes laundering is typically performed using cylindrical containers (hereinafter, drums). For example, a washing machine may include a rotatable drum to contain clothing (and/or other textiles) and fluids during wash, rinse, and spin-dry cycles. Various types of industrial machines use rotatable drums in a similar way, e.g., for dyeing, coating, mixing, drying, or performing other batch processes.

Drums are typically loaded and unloaded manually, and multiple such transfers may be required to complete a sequential process involving multiple drums. For instance, a first drum may be used for washing, and a second drum may be used for drying. Especially in commercial and industrial settlings, systems and methods that reduce or eliminate touch labor associated with loading and unloading of drums would be advantageous.

SUMMARY OF THE INVENTION

The invention seeks to overcome the labor burden associated with loading and unloading washing machines and similar rotatable drum equipment. Embodiments of the invention provide a cartridge bin, and a rotatable drum that is configured to cooperate with the cartridge bin, to facilitate automated or semi-automated loading and unloading. In operation, articles can be disposed in the cartridge bin, and the cartridge bin can be selectively nested in and coupled to the rotatable drum for processing the articles.

DESCRIPTION OF THE DRAWINGS

Embodiments of the invention are illustrated in the drawings, wherein.

DETAILED DESCRIPTION

Figure 1:
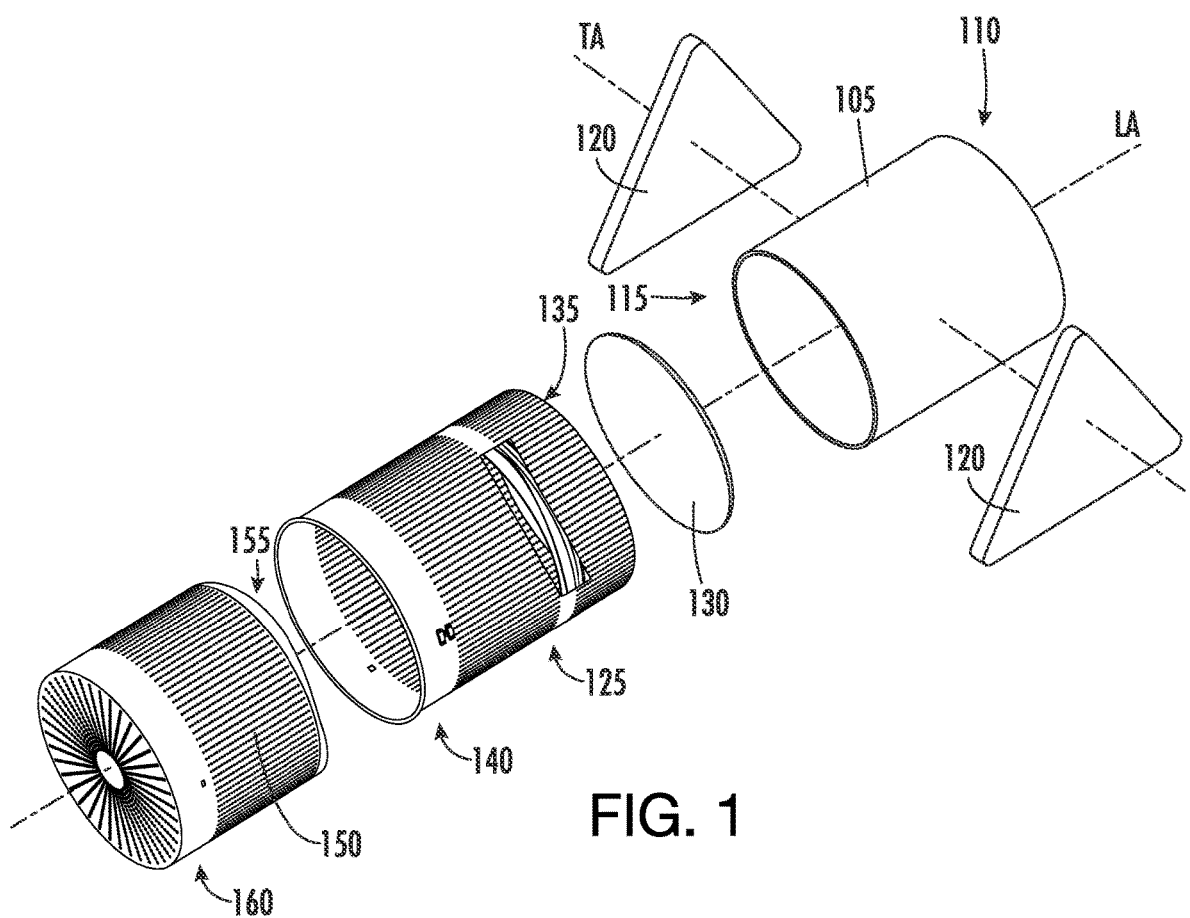
FIG. 1 is an exploded perspective view of a processing system, according to an embodiment of the invention.

This section describes embodiments of the invention with reference to FIGS. 1, 2A-F, 3A-3F, 4A-4B, and 5A-5B. Such embodiments are meant to be illustrative and not restrictive. In the drawings, reference designators are reused for the same or similar features. Some features may be simplified, omitted, or not specifically referenced for descriptive clarity. Although sub-headings are used below for organizational convenience, disclosure of any particular feature is not necessarily limited to any section.

System Overview

FIG. 1 is an exploded perspective view of a processing system, according to an embodiment of the invention. Outer drum 105, inner drum 125, and cartridge bin 150 are hollow cylindrical containers that are configured for nesting, as further described below.

The outer drum 105 has a closed end 110, an open end 115, and a solid side wall. The outer drum 105 is coupled to a carrier 120 via pivot points (not shown) that allow the outer drum 105 to selectively rotate about tilt axis TA. In the illustrated embodiment, the outer drum 105 cannot rotate about the linear axis LA.

A solid end plate 130 is rigidly affixed to the inner drum 125 to form a closed end 135. In the illustrated embodiment, the inner drum 125 includes a side wall that is at least partially perforated to facilitate drainage of fluids. The inner drum 125 is configured to be movably disposed within the outer drum 105. A motor assembly (not shown) may be rigidly mounted to the closed end 110 of the outer drum 105, and a hub (not shown) may be rigidly mounted to the end plate 130; in this instance, a linear drive shaft (not shown) can couple between the motor assembly and the hub to enable rotation of the inner drum 125 about the linear axis LA and within the outer drum 105.

The cartridge bin 150 has a closed end 160 and an open end 155. In the illustrated embodiment, the closed end 160 and the side wall of the cartridge bin 150 are at least partially perforated to facilitate drainage of fluids. The cartridge bin 150 is configured to removably nest within, and selectively couple to, the inner drum 125, as will be further described below.

In an assembled configuration, the end plate 130 is fixed to the inner drum 125, and the inner drum 125 is disposed in the outer drum 105. During use, clothing or other articles can be deposited into the cartridge bin 150 via the open end 155, and the cartridge bin 150 can then be nested within the inner drum 125. The cartridge bin 150 and inner drum 125 include certain aligning and coupling features (described further below). When selectively coupled, the cartridge bin 150 can rotate about the linear axis LA according to the rotation of the inner drum 125. Moreover, in the illustrated embodiment, both the cartridge bin 150 and the inner drum 125 can rotate about the tilt axis TA according to the rotational tilt of the outer drum 105. The cartridge bin 150 can be selectively uncoupled from the inner drum 125, and the clothing or other articles can be further processed in another drum, if appropriate, without removing them from the cartridge bin 150.

Variations to the system and components illustrated in FIG. 1 and discussed above are possible. For instance, in alternative embodiments, the outer drum 105 may not be required at all, or may not be configured to rotate about the tilt axis TA. Cylindrical components 105, 125, 150, nest within each other (at least partially, and preferably fully). In an alternative embodiment, powered rollers in contact with an exterior surface of the inner drum 125 may rotate the drum 125 about the linear axis LA rather than the described (but not illustrated) linear drive shaft and hub. Based on application needs, it may not be necessary or appropriate to perforate the end or the side wall of the cartridge bin 150 and/or the inner drum 125. Features of the cartridge bin 150 and inner drum 125 can be used in the system illustrated in FIG. 1, or adapted to for use in other systems.

Cartridge Bin and Rotating Drum

Figure 2A:
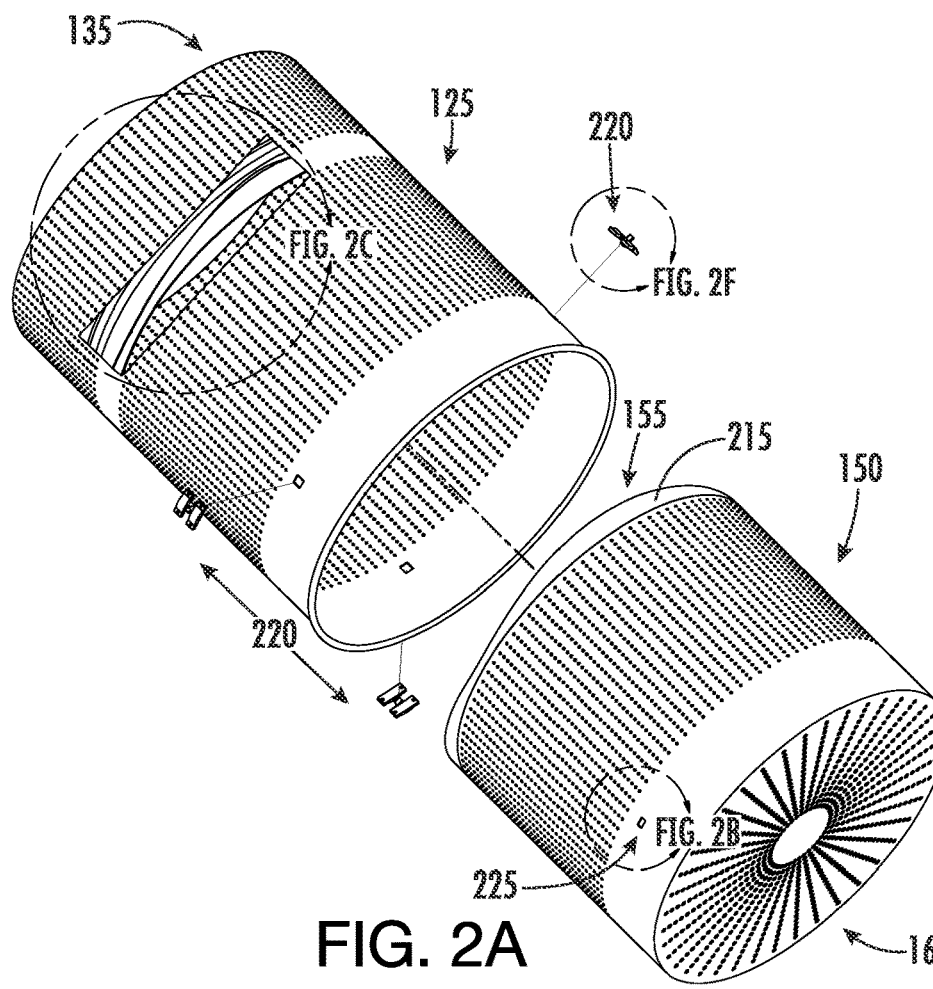
FIG. 2A is an exploded perspective view of a cartridge bin and an inner drum, according to an embodiment of the invention.
Figure 2B:
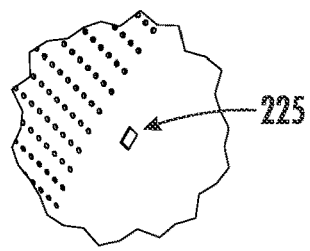
FIG. 2B is a detail view of the cartridge bin in FIG. 2A.
Figure 2C:
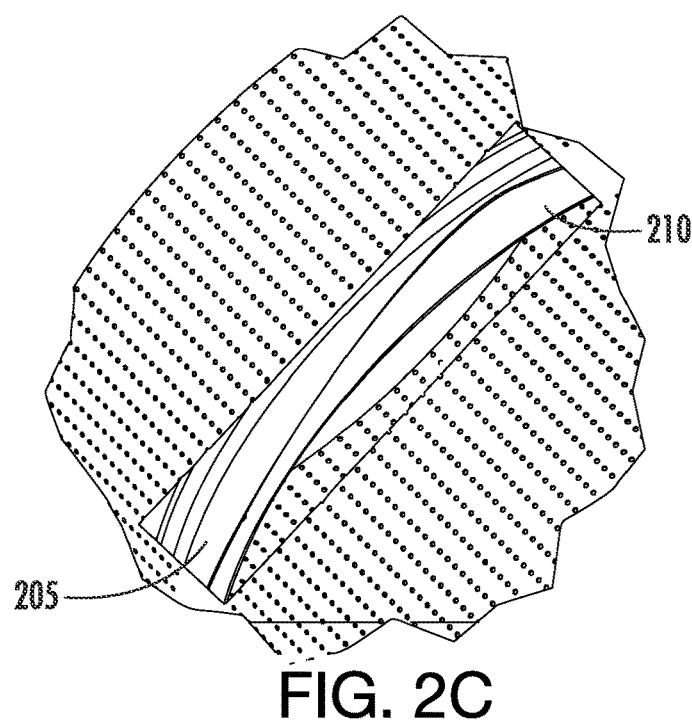
FIG. 2C is a detail view of the inner drum in FIG. 2A.

FIG. 2A is an exploded perspective view of the cartridge bin 150 and the inner drum 125, according to an embodiment of the invention. FIG. 2B is a detail view of the cartridge bin in FIG. 2A; FIG. 2C is a detail view of the inner drum in FIG. 2A.

FIGS. 2A-2C illustrate features that enable alignment and selective coupling of the cartridge bin 150 to the inner drum 125. In particular, contoured lip 215 at the open end 155 of cartridge bin 150 is configured to cooperate with cartridge guide ring 205 that is attached to an interior surface of the inner drum 125. These features align the cartridge bin 150 to a desired rotational position about the linear axis LA with respect to the inner drum 125. The cover 210, also attached to an interior surface of the inner drum 125, aids in this objective and also protects these features during use. This rotational alignment enables latch assemblies 220 on the inner drum 125 to engage corresponding receiving holes 225 on the cartridge bin 150. These latch engagements cause the cartridge bin 150 to rotate about the linear axis LA according to the rotational movement of the inner drum 125. Although three latch assemblies 220 are shown in FIG. 2A, a different number of latch assemblies 220 (and corresponding receiving holes 225) could be used according to design choice.

Figure 2D:
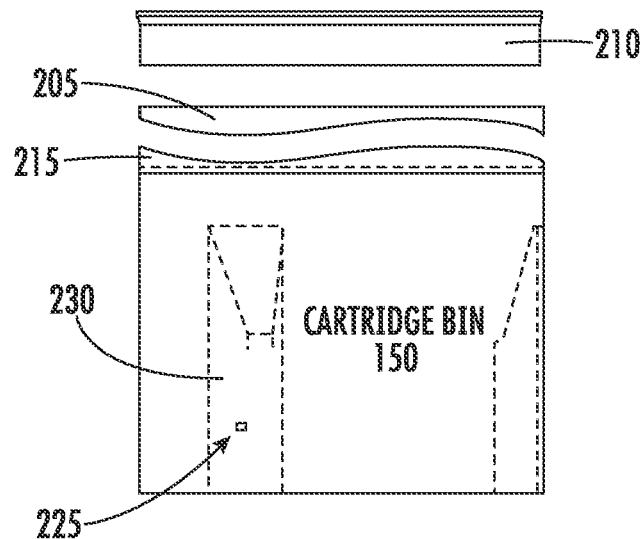
FIG. 2D is an exploded elevation view for selected features of the cartridge bin and the inner drum presented in FIG. 2A.

FIG. 2D is an exploded elevation view for selected features of the cartridge bin 150 and the inner drum 125 presented in FIGS. 2A-2C. FIG. 2D further illustrates cooperation between the contoured lip 215 and the cartridge guide ring 205. FIG. 2D newly illustrates two of three baffles 230 disposed on an inner side wall of the cartridge bin 150 used to facilitate movement of clothing or other articles contained therein when the cartridge bin 150 is rotating. In addition, FIG. 2D shows that each receiving hole 225 is preferably disposed in the side wall of the cartridge bin 150 adjacent to a baffle 230.

Figure 2E:
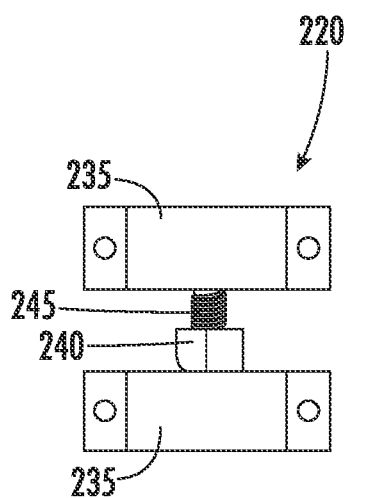
FIG. 2E is an elevation view of a latch assembly presented in FIG. 2A.
Figure 2F:
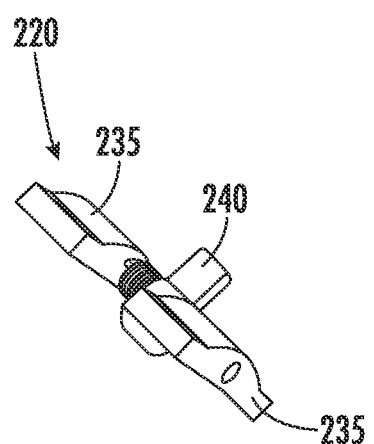
FIG. 2F is a perspective view of the latch assembly presented in FIG. 2A.

FIG. 2E is an elevation view of the latch assembly 220 presented in FIG. 2A; and FIG. 2F is a perspective view of the latch assembly 200 presented in FIG. 2A. As shown, each latch assembly 220 includes a spring shaft 245 disposed between first and second mounting plates 235, and a cam lever 240 disposed on the spring shaft 245. An end portion of the cam lever 240, in particular, is configured to communicate with a corresponding receiving hole 225 in the cartridge bin 150, as shown in FIGS. 4A-4B and 5A-5B.

Figure 3A:
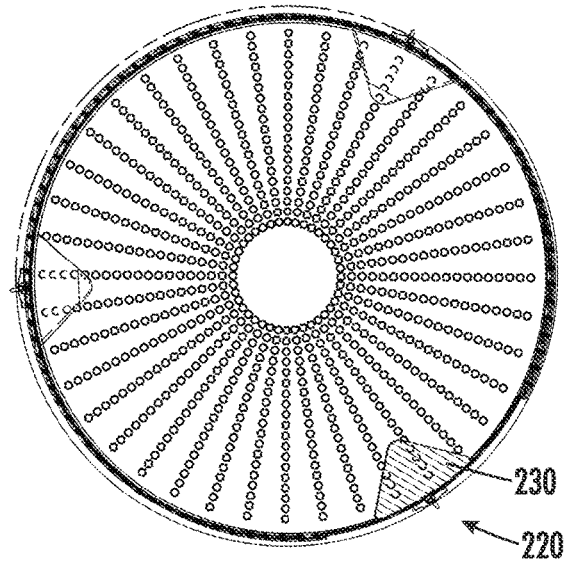
FIGS. 3A-3F are each assembly views of the cartridge bin and the inner drum presented in FIG. 2A, FIGS. 3A and 3B being presented in transparent format.
Figure 3B:
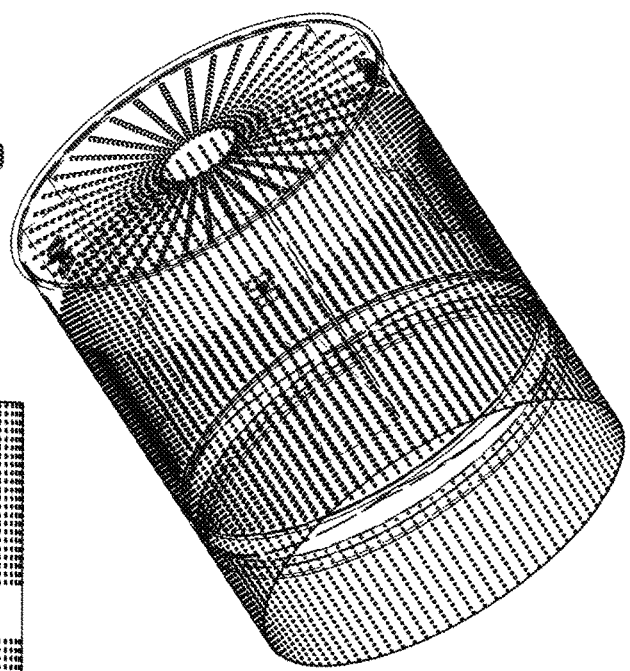
Figure 3C:
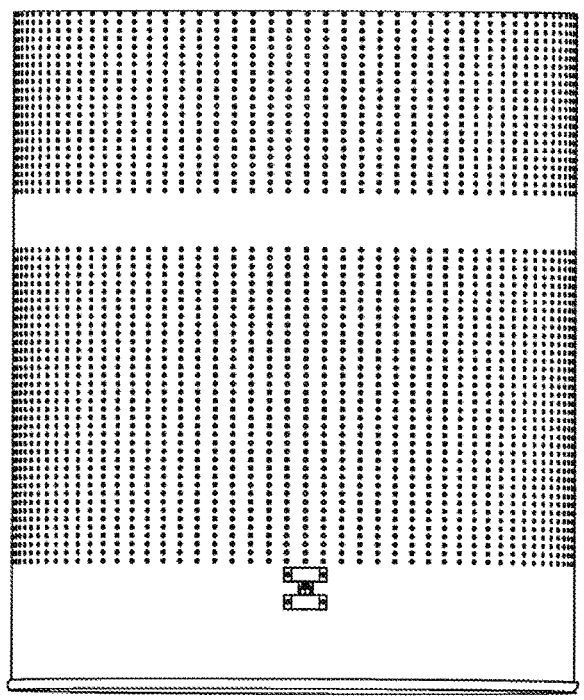
Figure 3D:
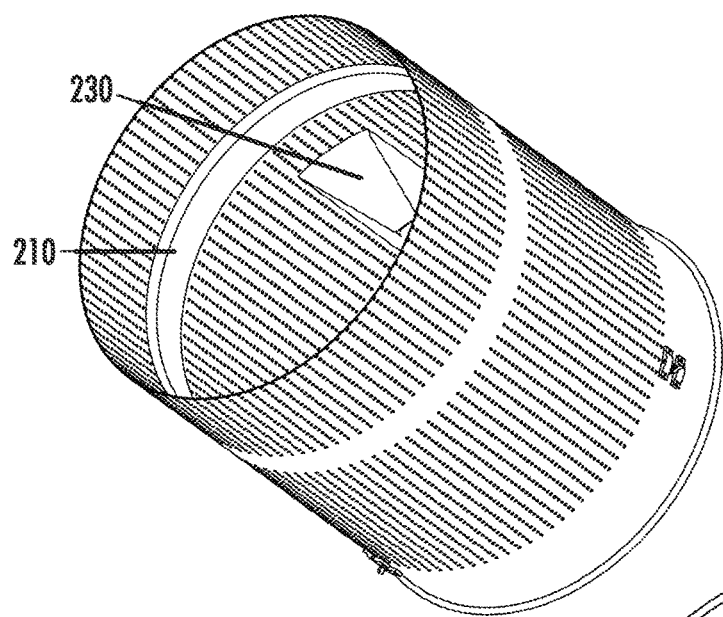
Figure 3E:
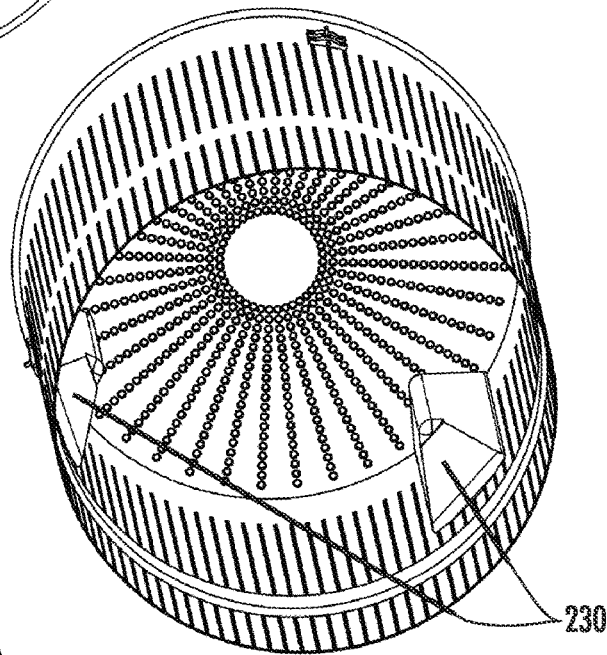
Figure 3F:
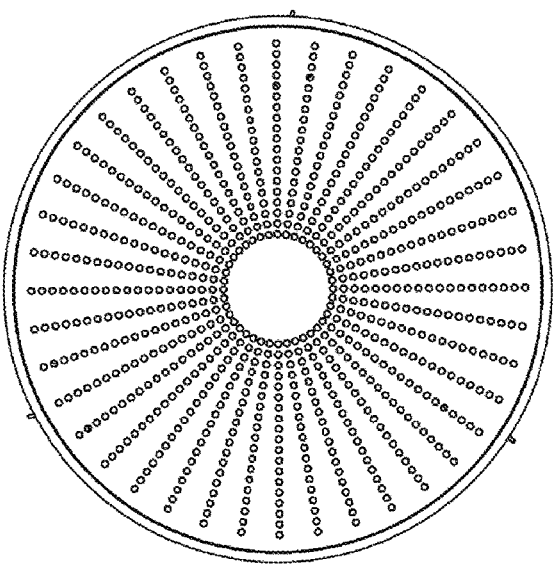

FIGS. 3A-3F are each assembly views of the cartridge bin 150 and the inner drum 125 presented in FIG. 2A, FIGS. 3A and 3B being presented in transparent format. FIG. 3A illustrates alignment of each baffle 230 with a corresponding latch assembly 220 when the cartridge bin 150 is coupled to the inner drum 125. FIG. 3D best shows cover 210. FIGS. 3D and 3E provide perspective views of baffles 230 disposed on an inner side wall of the cartridge bin 150. End plate 130 omitted from FIGS. 3A-3F for clarity.

Figure 4A:
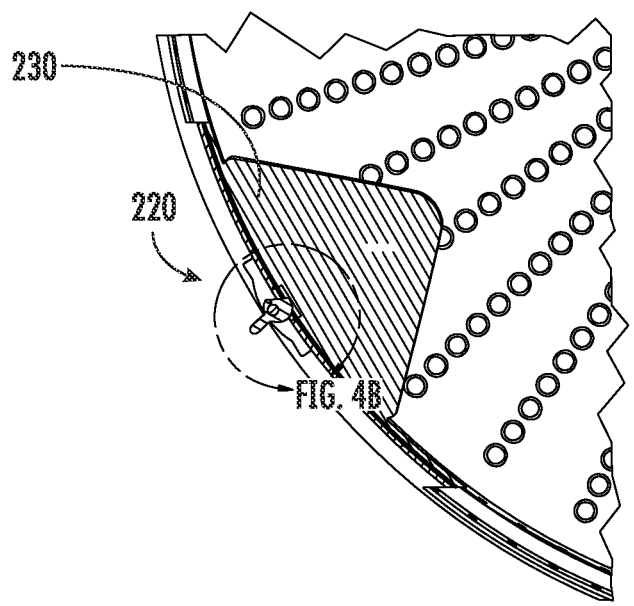
FIG. 4A is portion of the assembly presented in FIG. 3A.
Figure 4B:
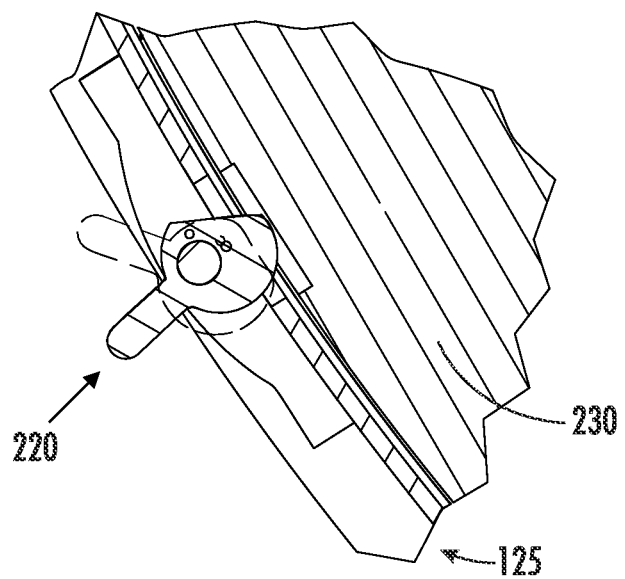
FIG. 4B is a detail view of a portion of FIG. 4A.
Figure 5A:
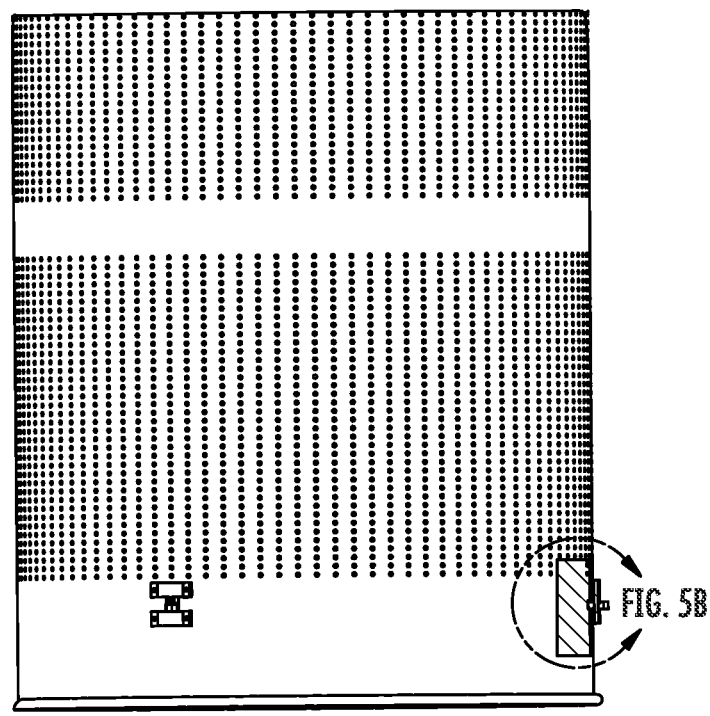
FIG. 5A is a side elevation view of the assembly presented in FIGS. 3A-3F.
Figure 5B:
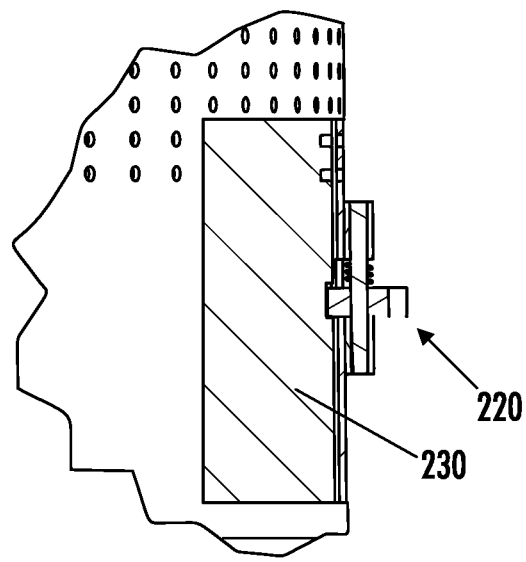
FIG. 5B is a detail view of a portion of FIG. 5A.

FIGS. 4A and 4B illustrate latch assembly 220 from a top view when the cartridge bin 150 and the inner drum 125 are aligned and coupled; FIGS. 5A and 5B illustrate the latch assembly 220 from a side elevation view when the cartridge bin 150 and the inner drum 125 are aligned and coupled. Locating each receiving hole 225 in the side wall of the cartridge bin 150 at a baffle 230 location prevents the cam lever 240 from interfering with articles disposed in the cartridge bin 150.

In use, the open end 155 of the cartridge bin 150 is presented to the open end 140 of the inner drum 125 while both components are generally disposed along the linear axis LA. As the cartridge bin 150 is nested into the inner drum 125, alignment features 215 and 205 cooperate to rotationally align the cartridge bin 150 to a desired position with respect to the inner drum 125. Finally, the cam levers 240 are actuated such that latch assemblies 220 on the inner drum 125 engage corresponding receiving holes 225 on the cartridge bin 150.

Variations are possible compared to what is illustrated in FIGS. 2A-2F, 3A-3F, 4A-4B, and 5A-5B. For instance, in alternative embodiments, complimentary shapes that are different from those shown are used for the cartridge guide ring 205 and countered lip 215 to facilitate rotational alignment. In an alternative embodiment, contoured lip 215 is disposed on an outer side wall of the cartridge bin 150 rather than at the open end 155 of the cartridge bin 150. Different hardware can be substituted for the latch assemblies 220 and corresponding receiving holes 225, according to design choice. For example, in an alternative embodiment, each latch assembly on the inner drum 125 may be or include a linear electromagnetic plunger that is configured to communicate with a corresponding round receiving hole on the cartridge bin 150. Other types of automated (no human intervention) or manual (human-operated) latches could also be used together with, or in place of, the illustrated latch assemblies 220. In alternative embodiments, the number, shape, and location of baffles 230 vary. Baffles 230 may be omitted altogether, according to application requirements.

SUMMARY

Embodiments of the invention thus provide a cooperating cartridge bin and rotatable drum for clothes washing or other applications. Those skilled in the art can readily recognize that numerous variations and substitutions may be made in the invention, its use and its configuration to achieve substantially the same results as achieved by the embodiments described herein. Moreover, features disclosed in this specification could be combined in ways not expressly illustrated or discussed. Accordingly, there is no intention to limit the invention to the disclosed exemplary forms and applications. Many variations, modifications and alternative constructions fall within the scope and spirit of the disclosed invention.

REFERENCE DESIGNATORS THIS DISCLOSURE

LA linear axis
TA tilt axis
105 outer drum
110 closed end [of outer drum 105]
115 open end [of outer drum 105]

120 carrier
125 inner [rotatable] drum
130 end plate [of inner drum 125]
135 closed end [of inner drum 125]
140 open end [of inner drum 125]
145 [not used]
150 cartridge bin
155 open end [of cartridge bin 150]
160 closed end [of cartridge bin 150]
205 cartridge guide ring
210 cover
215 contoured lip
220 latch assembly
225 receiving hole
230 baffle
235 mounting plate
240 cam lever
245 spring shaft

We claim:

1. A system comprising:
a rotatable drum; and
a cartridge bin configured to selectively couple to the rotatable drum, the cartridge bin being configured to nest inside the rotatable drum on a linear axis common to the rotatable drum and the cartridge bin, the rotatable drum having guide ring, the cartridge bin having a contoured lip, a contour of the guide ring being complimentary with a contour of the contoured lip such that communication between the guide ring and the contoured lip aligns the cartridge bin in a predetermined rotational position about the linear axis with respect to the rotatable drum.

2. The system of claim 1, wherein the guide ring is disposed on an inner side wall of the rotatable drum, and wherein the contoured lip is disposed at an open end of the cartridge bin.

3. The system of claim 1, wherein the guide ring is disposed on an inner side wall of the rotatable drum, and wherein the contoured lip is disposed on an outer side wall of the cartridge bin.

4. The system of claim 1, wherein a baffle is disposed on an inner side wall of the cartridge bin, the baffle configured to facilitate movement of articles disposed in the cartridge bin when the cartridge bin is rotating about the linear axis.

5. The system of claim 1, further comprising a latch disposed on the rotatable drum to selectively couple the cartridge bin to the rotatable drum, the latch enabling the cartridge bin to rotate about the linear axis according to the rotational movement of the rotatable drum.

6. The system of claim 5, wherein the latch includes a cam lever disposed on a spring shaft, and wherein a portion of the cam lever is configured to communicate with a corresponding receiving hole disposed in a side wall of the cartridge bin.

7. The system of claim 5, wherein the latch includes a linear electromagnetic plunger.

* * * * *